United States Patent Office 3,442,041
Patented May 6, 1969

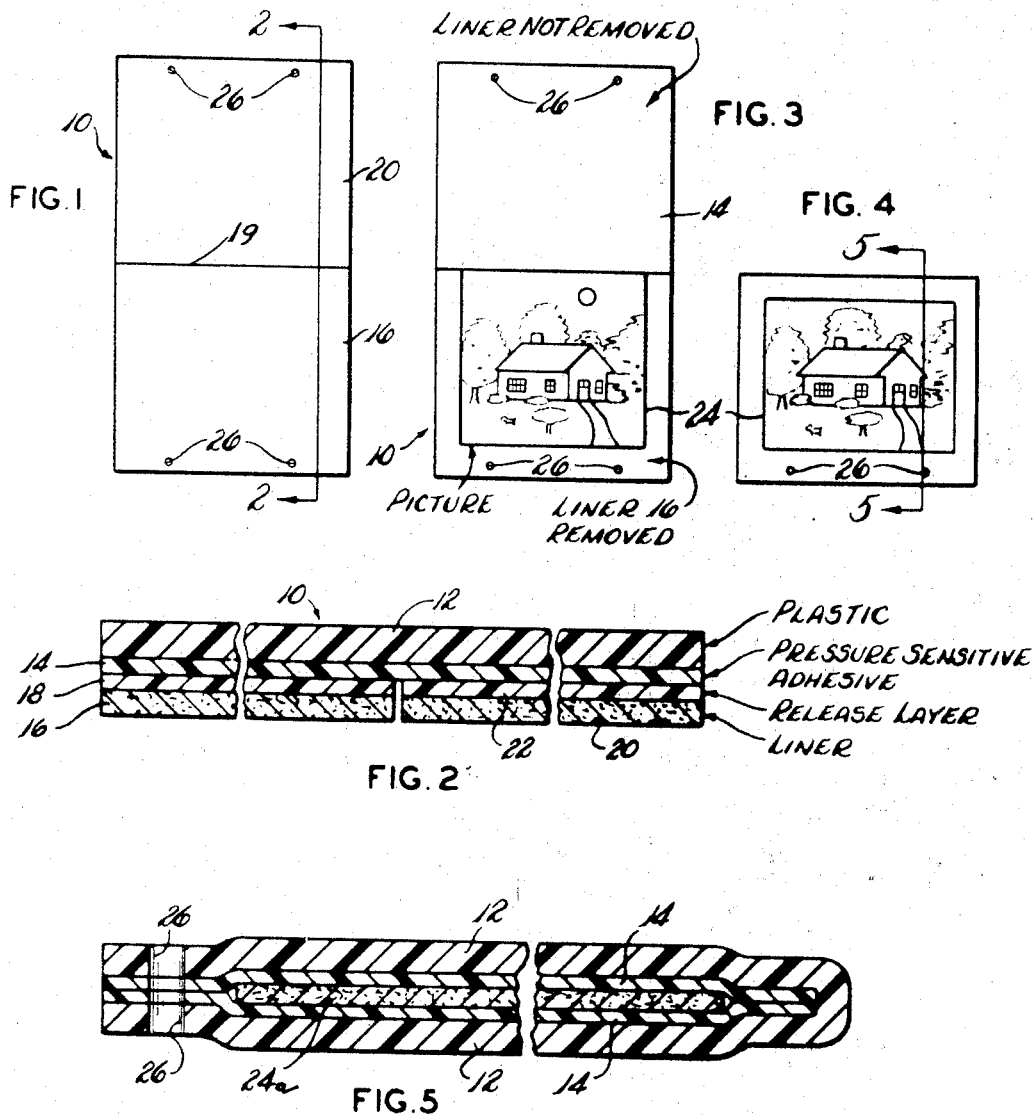

3,442,041
PLASTIC PHOTO MOUNT
Burton D. Morgan, Hudson, Ohio, assignor to Morgan Adhesives Company, Stow, Ohio, a corporation of Ohio
Filed Oct. 4, 1966, Ser. No. 584,268
Int. Cl. G09f 1/10
U.S. Cl. 40—158    2 Claims

ABSTRACT OF THE DISCLOSURE

A plastic photo mount laminate including a sheet of clear plastic of substantially rectangular shape has a pressure sensitive adhesive on the entire area of one surface of such sheet. Liner means in the form of first and second liner sheets are applied to the adhesive surface of the plastic sheet and are separately removable whereby the first liner sheet can be removed and an edge of a photo be abutted against an edge of the second liner to position the photo accurately in the laminate. Then the second sheet can be removed and the plastic sheet folded over into engage the exposed areas of adhesive on the non-folded sheet portion, the photo being smalled in size than one-half the area of the plastic sheet.

---

This invention relates to a plastic photo mount, and more particularly to a do-it-yourself photo mount which is very inexpensive to manufacture, and yet which allows great selectivity to permanently mount photos to prevent damage thereto.

Heretofore, it has been known that there have been many and various ways for mounting photos in scrapbooks or other similar type display books or binders. However, these attempts generally make it awkward and cumbersome to mount the photos, as well as not providing a permanent preservation for the photos themselves. A simple, cheap, and highly effective photo mount is needed by the art.

Therefore, it is the general object of the present invention to meet this requirement of the art by providing a plastic photo mount which is inexpensive to manufacture, yet allows a laminated mount of the photo between clear plastic and pressure sensitive adhesive to achieve a permanent and extremely attractive mount.

A further object of the invention is to provide a photo mount which can be utilized for a notebook punch type insertion, and still allows a full plastic coverage of the photo and insures preservation thereof, and where no trimming is necessary.

Another object of the invention is to facilitate the accurate positioning of a picture, photograph or the like in a protective display means.

For a better understanding of the invention, reference should be had to the accompanying drawings, wherein:

FIGURE 1 is a plan view of a laminate illustrating the preferred embodiment of the invention;

FIGURE 2 is an enlarged cross sectional, broken away elevation of the laminate taken on line 2—2 of FIGURE 1;

FIGURE 3 is a plan view similar to FIGURE 1 illustrating the positioning of a photograph with respect to the preferred embodiment of the invention;

FIGURE 4 is a plan view illustrating a photograph in permanent position; and

FIGURE 5 is an enlarged cross section, broken away elevation of a laminate with the photograph in position on line 5—5 of FIGURE 4.

While it should be understood that the apparatus of the invention could be utilized for positioning and preserving for display almost any type of article, it has been particularly devised for displaying photos in scrapbooks, albums, binders, or the like, and hence it has been so illustrated and will be so described.

With specific reference to the form of the invention illustrated in the drawings, the numeral 10 indicates generally a laminate comprising a large rectangularly shaped transparent plastic facing sheet 12 with a layer of transparent pressure sensitive adhesive 14 completely covering one surface thereof. Normally one-half of the pressure sensitive adhesive layer 14 is covered and protected by a first liner 16 which is releasably mounted to the adhesive layer 14 by a conventional release coating or layer 18. The other half of the adhesive layer 14 is covered by a second liner 20, which again is removably secured to the layer 14 by a release layer 22. A fold line 19 may be indicated on the liner means and/or on the plastic sheet 12. The invention contemplates that any suitable pressure sensitive adhesive can make up the layer 14, while the liners 16 and 20 will preferably be paper. The release layers 18 and 22 may be made from any material which is standard or well known in the art.

In practice, then the invention contemplates that one can buy the laminate of the invention in sheets at a department store, or the like, and take them home for mounting photos in a very attractive and permanent form. In order to achieve the mounting, one simply removes the liner 16, for example, and one may position a photo 24 thereon in a substantially central location, as indicated in FIGURE 3. However, a particular feature of the invention is that the article or picture to be mounted may have one edge thereof abutted against the adjacent edge of the second liner 20, as shown in FIGURE 3, and then only the lateral margins, if any, of the article, picture or photo 24 need be estimated. Naturally the photo 24 is not larger than the liner 16 that has been removed. The photo 24 hence may be considered to abut on the fold line 19. Naturally, the pressure sensitive adhesive layer 14 holds the photo 24 in its properly positioned relationship when the liner 16 is removed. The liner 20 is then removed, and the plastic 12 is folded back on itself over the photo 24 and firmly pressed into position, so the adhesive layer adheres not only to the exposed surface of the photo, but to itself around any exposed margins of the photo, thus insuring a complete mounting and preservation of the photo 24. If desired, a photograph 24a can be mounted as shown in FIGURE 4.

In order to facilitate the mounting of the laminate of the invention in a binder-type scrapbook, the invention contemplates that a plurality of holes 26 of any suitable size and reenforced in any suitable manner, if desired, are provided in each end thereof, which holes are in registry to each other when the plastic 12 is folded back on itself and registered, as illustrated in FIGURES 4 and 5. It should be understood that when the plastic is folded back on itself to firmly and securely position the photo in a preserved relationship, the registration not only maintains the photo in sealed relationship, but eliminates the necessity for any trimming or other adaptation of the photo mount. In other words, it is ready at this point to be inserted into the scrapbook or other binder. FIGURE 5 very clearly illustrates the folded over relationship of the plastic layer 12 onto itself and registration of the holes 26 to firmly pocket or embed the picture 24a with the pressure sensitive adhesive firmly holding the photo in position.

It should be understood that with the plastic 12 being clear, it is possible to position two photos in back-to-back relationship so that one may be viewed from one side of the laminate and the other from the other side and both would be maintained in registered and preserved relationship by the photo mount apparatus of the invention, as long as the photos each are smaller than one-half of the sheet 12. In such instance the photo on the layer 12 in the portion initially covered by the liner 16 would be face down and the photo on the space covered initially by the liner 20 would also be applied face down to the adhesive layer 14. Such photos could abut the fold line 19 or be spaced therefrom slightly as desired. While only a single photo is illustrated, of course it should be recognized that several smaller photos could be arranged over the same surface.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. In a plastic photo, or similar article mount laminate, the combination of
    a sheet of optically clear plastic of rectangular shape,
    a layer of transparent pressure sensitive adhesive covering the entire area of one surface of the sheet of plastic, and
    liner means removably adhered to the layer of pressure sensitive adhesive to cover the surface area of the sheet of plastic, said liner means comprising,
    a first liner removably adhered to the layer of pressure sensitive adhesive and covering one-half of the surface area of the sheet of plastic, and
    a second liner removably adhered to the layer of pressure sensitive adhesive and covering the remaining surface area of the sheet of plastic, whereby a photo may be adhesivley positioned and have one edge abutted against an edge of said second liner when the first liner is removed and have the photo positioned in the area previously covered by said first liner, then the second liner may be removed and the sheet of plastic folded over on itself whereby the adhesive on the folded over portion adheres to any exposed areas of the adhesive on the non-folded over portion and thereby will retain the photo in secured position, the photo being smaller in size than one-half the area of said plastic sheet.

2. A plastic photo mount laminate according to claim 1 where a photo is positioned therein, one edge of the positioned photo abuts the fold line of the sheet of plastic, and marginal portions of the plastic sheet are secured together by an adhesive to adhesive contact.

References Cited

UNITED STATES PATENTS

| | | | |
|---|---|---|---|
| 2,349,340 | 5/1944 | Conway | 40—158 |
| 2,835,062 | 5/1958 | Greene et al. | 40—158 |
| 3,024,553 | 3/1962 | Rowley | 40—158 |
| 3,069,793 | 12/1962 | Francescon | 40—22 |
| 3,335,514 | 8/1967 | Blackman | 40—158 |

BENJAMIN A. BORCHELT, *Primary Examiner.*